Sept. 30, 1952  I. C. BLAKE  2,612,537
PRIMARY CELL
Filed May 5, 1951
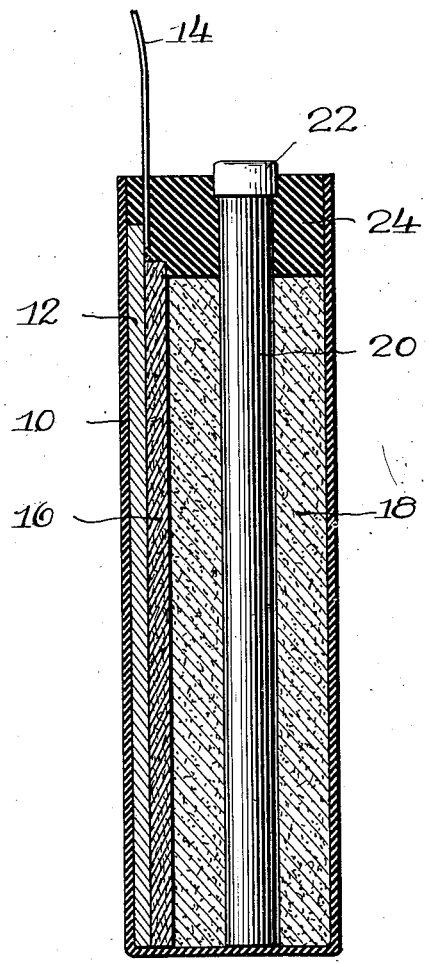
Inventor
Ivan C. Blake
By: Jones, Leoch + Darbo
Attys Patented Sept. 30, 1952

2,612,537

UNITED STATES PATENT OFFICE 2,612,537

PRIMARY CELL

Ivan C. Blake, Freeport, Ill., assignor to Burgess Battery Company, Freeport, Ill., a corporation of Delaware Application May 5, 1951, Serial No. 224,685

9 Claims. (Cl. 136—107)

This invention relates to improvements in current-producing primary battery cells and particularly to cells of this character having a magnesium negative electrode.

The use of magnesium as the negative electrode in current-producing primary cells has been attractive because of the greater electrolytic activity of this metal in comparison with the more commonly used metal zinc, and the resulting higher voltage and greater current-delivering powers of cells employing magnesium. However, magnesium is much more susceptible to spontaneous corrosion than is zinc and the problem of holding such corrosion in check has been so serious that the use of magnesium in current-producing primary cells has been severely limited because satisfactory shelf life is not obtained.

It is the object of the present invention to provide an improved current-producing primary cell having a negative electrode composed of magnesium, in which the objectionably spontaneous corrosion of the magnesium is successfully inhibited and a cell is provided having high voltage and energy-delivering capacity, and good shelf life.

In the copending application of Joseph J. Coleman and Demetrios V. Louzos, Serial No. 61,244, filed November 20, 1948, now U. S. Patent 2,597,451, granted May 20, 1952, a primary cell is disclosed having magnesium as the negative electrode and an electrolyte in which the solvent component is methanol and the solute component is from the group consisting of the chlorides, nitrates and perchlorates of magnesium and the metals electronegative to magnesium. Such a cell possesses substantial current-delivering properties and shelf life.

In my copending application, Serial No. 222,706, filed April 24, 1951, a cell is disclosed which is of the character described in the foregoing but in which the solvent component of the electrolyte is a consolute mixture of methanol and water, and a compound from the group consisting of chromium trioxide and the salts of chromic acid is included in the electrolyte. Such a cell also possesses strong current-delivering powers and substantial shelf life.

In accordance with the invention, it has been discovered that a cell of the general character described in my copending application mentioned in the foregoing and employing a double chromate of barium in access relation to the electrolyte possesses unexpectedly superior properties with respect to both current-delivering powers and shelf life. In such cell, the negative electrode is magnesium, the electrolyte solvent is a consolute mixture of water and methanol, the solute component is a compound from the group consisting of the chlorides, nitrates and perchlorates of magnesium and the metals electronegative to magnesium in the solution, and the double chromate is from the group consisting of barium potassium chromate, barium sodium chromate and barium ammonium chromate. Barium potassium chromate is a true double chromate and the other compounds each exist as a mixture of the true double chromate and the two single chromates involved. For convenience, they will all be referred to herein as double chromates. Barium potassium chromate is the preferred compound.

In order to fully understand the invention, it will be described in connection with a specific embodiment of a primary cell. Since the invention relates to the composition of the cell, it is to be understood that the embodiment is given by way of illustration only and that the invention is not limited thereto but may be applied to cells of other structural form.

The single figure of the drawing is a sectional elevation of the embodiment of the cell.

The cell is of rectangular shape and has flat surfaces and is adapted to be arranged in stacked relation with and electrically connected to additional cells to form a multiple cell battery of flat rectangular shape. It has an open top rectangular envelope 10 of non-conductive, electrolyte-resistant material, such as rubber hydrochloride, a polymer of ethylene, the copolymer of vinyl chloride and vinyl acetate, or the like, which serves as the container for the cell elements. Within the envelope 10 and adjacent to a wall thereof is the negative electrode 12 which is composed of magnesium and is in the form of a thin flat plate. A terminal lead 14 is connected to the negative electrode 12 as by welding or soldering, and projects above the top of the envelope 10. Adjacent to the negative electrode 12 is the separating member 16, which is a sheet or layer of bibulous, non-conductive material, such as absorbent paper. Adjacent to the separator 16 is a rectangular block of compressed depolarizing mix 18, which may be of any suitable composition, such as a mixture of powdered manganese dioxide and carbon, powdered lead dioxide and carbon, etc. The separator 16 and depolarizing mix 18 are moistened with the liquid electrolyte which will be described hereinafter. The separating member 16 prevent contact between the depolarizing mix 18 and the negative electrode 12. Embedded within the depolarizing mix 18 is the upright carbon rod 20 which serves as the positive electrode of the cell. Fitted upon the top end of the carbon rod 20 is the metal terminal cap 22.

The envelope 10 extends above the tops of the cell elements except for the terminal lead 14 and the terminal cap 22. The space in the upper portion of the envelope 10 is filled with a fusible sealing composition 24, which may be composed of wax or pitch, and which forms a seal closure for the cell. The terminal lead 14 and the upper portion of the terminal cap 22 projects above the closure 24. In making a multiple cell battery, the cells are stacked together and held in pressure contact with one another in such manner that the elements of each cell are in firm contact with one another. In practice, the cells of the battery are usually sealed simultaneously and a common seal is formed for the cells and the battery. The negative terminal 14 of one cell is connected as by soldering to the positive terminal 22 of the adjacent cell whereby the cells are connected in series.

The liquid electrolyte which moistens the separating member 16 and depolarizing mix 18 is in contact with the negative electrode 12 and positive electrode 20, and it is at the surface of the negative electrode which is exposed to said electrolyte that the spontaneous corrosion takes place unless it is successfully inhibited.

In the cell of the present invention, the solvent component of the electrolyte is a mixture of water and methanol in which the water may be present in an amount up to about 70% of the weight of the mixture.

The solute component of the electrolyte is composed of a suitable compound which is soluble in the solvent and in the resulting solution is electrolytically reactive toward the negative electrode and does not cause plating of metal upon said electrode. Compounds which have been found to be suitable are the chlorides, nitrates and perchlorates of magnesium and the metals which are electronegative to magnesium in the solution, which includes essentially those metals which are at least as high as magnesium in the electromotive series. Mixtures of the compounds may be used. The said compounds are soluble in both water and methanol. The compounds which are preferred are the chloride, nitrate and perchlorate of magnesium.

At ordinary temperature, magnesium chloride and magnesium nitrate normally exist in the form of the hexahydrates

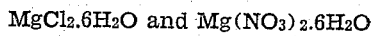

$MgCl_2.6H_2O$ and $Mg(NO_3)_2.6H_2O$ and magnesium perchlorate exists in the anhydrous form and also in the form of various hydrates. Such hydrates, as well as the anhydrous perchlorate, are all suitable for use and for convenience will herein, in the specification and claims, be referred to simply as the chlorides, nitrates and perchlorates.

The amount of electrolyte compound which may be included is not critical. It is required to supply only sufficient thereof to provide the desired conductivity and electrolytic action. Amounts from 30% to 70% of the weight of the electrolyte have been used with satisfactory results.

In accordance with the present invention, a compound from the group consisting of barium potassium chromate, barium sodium chromate and barium ammonium chromate is incorporated in the cell to assist in inhibiting the spontaneous corrosion of the magnesium electrode. Mixtures of the said double chromates of barium may be used if desired. The manner in which the inhibiting function is accomplished is not understood, but it is believed to be by an action which takes place at the surface of the negative electrode which is exposed to the electrolyte. In each of the solvents water and methanol the compounds are sparingly soluble and go into solution slowly. For example after standing in water at approximately 70° F. for 72 hours with periodical shaking, 1.8 grams of barium potassium chromate have gone into solution in 100 grams of the solvent. In a similar procedure with methanol, 0.144 gram of the compound becomes dissolved in 100 grams of the solvent. The solubilities of the other compounds are slightly greater, the corresponding solubility in water being 2.38 grams for barium sodium chromate and 3.14 grams for barium ammonium chromate.

The compound may be introduced into the cell in any desired manner. For example, it may be incorporated in the electrolyte, the separating layer 16 or the depolarizing mix 18. Any of these methods of introduction produce substantially the same results in effectively inhibiting spontaneous corrosion of the magnesium electrode. The preferred method is to incorporate it in the depolarizing mix by mixing it with the remainder of the ingredients of said mix. Since the mix is moistened with the electrolyte, the compound becomes dissolved in the electrolyte and thereby is made available at the surface of the magnesium electrode for the inhibiting function. In other words, by any of these methods of introduction, the barium potassium chromate is made accessible to the electrolyte, that is, it is brought into access relation with the electrolyte which, in turn, is in contact with the magnesium electrode. Because of its solubility in the electrolyte, the compound is thereby made available at the electrode for its inhibiting function.

The amount of the double chromate of barium which may be used is not critical and may be varied over a relatively wide range. Only a small quantity is required and an excessive amount should be avoided as the excess represents a waste of the compound and may occupy space which would otherwise be occupied to better advantage by depolarizing mix, which is an important energy-producing element of the cell. Amounts which have been used with success are about 0.25% to 6.0%, expressed in terms of $CrO_3$ based on the weight of the solvent component of the electrolyte, by which is meant the methanol and the free water, and does not include combined water which may be present, such as the water of hydration of the solute. This is equivalent to .00025 to .006 gram of $CrO_3$ per square centimeter of magnesium electrode surface exposed to the electrolyte. An amount greater than given in the foregoing may be used but generally is not warranted by improved results. The compound does not all go into solution in the electrolyte initially, but a portion of it does and it is believed that this portion is active and consumed in the corrosion inhibiting function, and that as it is consumed more of it goes progressively into solution and is released for use in the inhibiting action. It is believed that such progressive release for the inhibiting function is at least part of the reason for the exceptionally favorable results obtained with the compounds.

A specific example of a cell of the invention is one of the flat construction described heretofore in which the negative electrode 12 is of magnesium, the electrolyte solvent is a mixture of equal parts by weight of water and methanol and the solute is chloride in an amount of $MgCl_2 \cdot 6H_2O$ equal in weight to the solvent, and the depolarizing mix 18 is a mixture of finely divided manganese dioxide and thermal acetylene black in the form of a block 1.75 inches high by .70 inch wide and 0.10 inch thick, weighing 4.0 grams, and containing an amount of barium potassium chromate equal to approximately 0.153 gram. This is equivalent to approximately .02 gram of the compound per square centimeter of the magnesium electrode surface exposed to the electrolyte.

To demonstrate the superior performance of cells containing the double chromate of barium, comparative performance data is given in the table below for two lots of batteries, the cells of one lot containing barium potassium chromate and the cells of the other lot containing sodium chromate, which is representative of the chromium compounds used heretofore. The batteries of both lots were of similar construction except for the chromium compound. The amounts of depolarizing mix and of negative electrode material were the same in the cells of both lots. The batteries of lot 1 consisted of nine series-connected cells of the construction given in the foregoing specific example, and the batteries of lot 2 were similar except that instead of barium potassium chromate the cells contained sodium chromate in the electrolyte in an amount equivalent to 0.1% of the weight of the electrolyte. The batteries of each group were continuously discharged through a resistance of 15,000 ohms to an end point of 1.33 volts per cell. One group of the batteries of each lot was discharged when fresh, that is, within 48 hours after manufacture, a second group was stored at approximately 70° F. for three months and then subjected to discharge, and a third group was stored under similar conditions for twelve months and then subjected to discharge. The results of the discharge tests are given in the table below. The capacity is stated in hours of continuous discharge rendered before the end point of 1.33 volts per cell was reached. The capacity maintenance is the relation in percent of the delayed capacity to the fresh capacity.

Table

|  | Lot 1—Sodium Chromate | Lot 2—Barium Potassium Chromate |
| --- | --- | --- |
|  | Capacity | |
| Fresh | 271 | 293 |
| 3 months | 164 | 211 |
| 12 months | 109 | 138 |
|  | Capacity Maintenance | |
| At 3 months percent | 60 | 72 |
| At 12 months do | 40 | 47 |

The amount of sodium chromate in lot 1 is less than the amount of barium potassium chromate in lot 2 and the increased amount of barium potassium chromate results to a small extent favorably toward lot 2, but in no sense does it account for the substantial increase in performance shown by the table. The amount of sodium chromate is necessarily kept small because experience has shown that a large amount of soluble chromate in solution in the electrolyte depresses the voltage to an undesirable extent and produces a condition in which the initial voltage is low when the circuit is closed and builds up to normal voltage only gradually. The result is an undesirably sluggish cell. An important advantage of the use of the double chromates of barium described herein is that they do not depress the voltage or the ability to deliver current and provide a greatly improved cell having high voltage and great energy-delivering powers. The double chromates of barium described herein all provide performance advantages as shown by the data and explanation in the foregoing.

What is claimed is:

1. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium and the metals electronegative to magnesium in said electrolyte, and a compound from the group consisting of barium potassium chromate, barium sodium chromate and barium ammonium chromate in access relation with said electrolyte.

2. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium and the metals electronegative to magnesium in said electrolyte, and a compound from the group consisting of barium potassium chromate, barium sodium chromate and barium ammonium chromate in access relation with said electrolyte in an amount sufficient to provide about .00025 to .006 gram of $CrO_3$ per square centimeter of said magnesium electrode in contact with said electrolyte.

3. A primary cell comprising a positive electrode and a magnesium negative electrode, an electrolyte in contact with said electrodes having a solvent component comprising a mixture of methanol and water and a solute component from the group consisting of the chloride, nitrate and perchlorate of magnesium, and a compound from the group consisting of barium potassium chromate, barium sodium chromate and barium ammonium chromate in access relation with said electrolyte.

4. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium and the metals electronegative to magnesium in said electrolyte, and barium potassium chromate in access relation with said electrolyte.

5. A primary cell comprising a positive electrode and a magnesium negative electrode, an electrolyte in contact with said electrodes having a solvent component comprising a mixture of methanol and water and a solute component from the group consisting of the chloride, nitrate and perchlorate of magnesium, and barium potassium chromate in access relation with said electrolyte.

6. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium and of the metals electronegative to magnesium, and barium sodium chromate in acess relation to said electrolyte.

7. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium and of the metals electronegative to magnesium, and barium ammonium chromate in access relation to said electrolyte.

8. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium, and barium sodium chromate in access relation to said electrolyte.

9. A primary cell comprising a positive electrode and a magnesium negative electrode, an electrolyte in contact with said electrodes having a solvent component comprising a mixture of methanol and water and a solute component from the group consisting of the chlorides, nitrates and perchlorates of magnesium, and barium ammonium chromate in access relation to said electrolyte.

IVAN C. BLAKE.

REFERENCES CITED

The following references are of record in the file of this patent:

UNITED STATES PATENTS

| Number | Name | Date |
|---|---|---|
| 1,839,498 | Porth | Jan. 5, 1932 |
| 2,422,045 | Ruben | June 10, 1947 |
| 2,491,640 | Blake | Dec. 20, 1949 |